April 17, 1951     E. E. CRANE     2,548,951
SPROCKET CHAIN
Filed Aug. 13, 1948
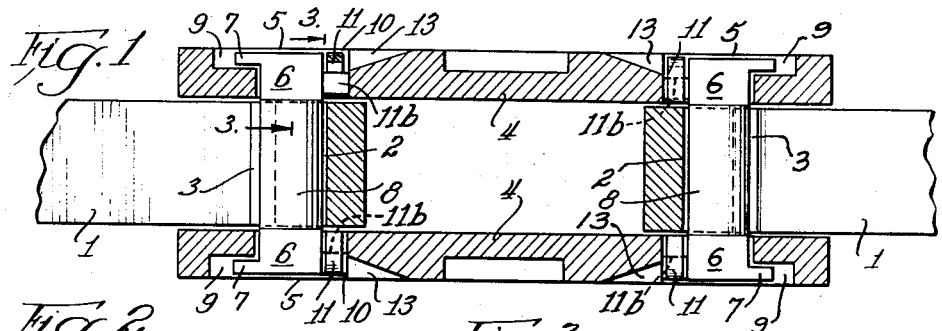
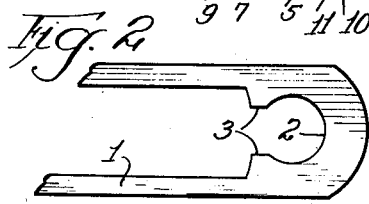
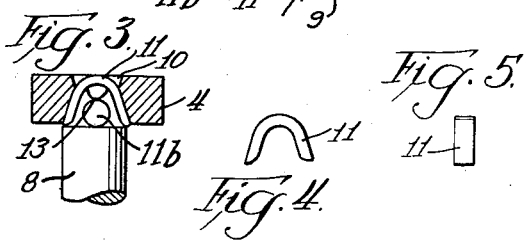
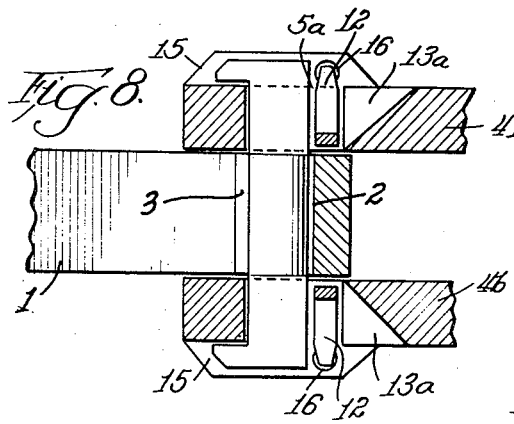
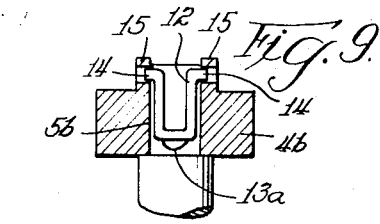
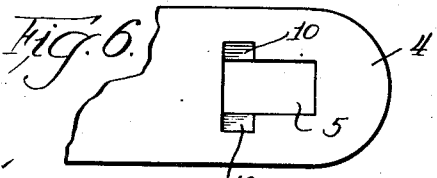
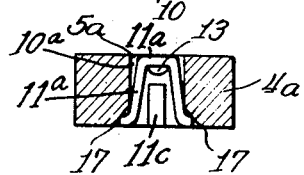
INVENTOR.
Ernest E. Crane Patented Apr. 17, 1951

2,548,951

UNITED STATES PATENT OFFICE 2,548,951

SPROCKET CHAIN

Ernest E. Crane, Chicago, Ill.

Application August 13, 1948, Serial No. 44,207

8 Claims. (Cl. 74—245)

1

This invention relates to improvements in a conventional type of sprocket chain and has for its main object to provide means whereby the chain is prevented from parting under the influence of back pressures caused by obstruction to travel of the chain.

The invention is directed, mainly, to improvements in the type of sprocket chain illustrated and described in the patent to Earl A. Lerner, No. 1,808,236, June 2, 1931, wherein the links of the chain are pivotally joined by means of removable pivot pins which are prevented from becoming disengaged from the links by means of cotter pins which are fragile and are often sheared by the back pressure aforesaid, it being obvious that the structure of the instant invention may be incorporated into many of a great variety of sprocket chains wherein the pivot pins are movable longitudinally of alternate links and must be equipped with removable means to prevent their relative movement.

A further object of the invention is to provide very simple and efficient means for retaining the pivot pins in place which are not subjected to any stress other than compression stresses and which can be easily removed and replaced at very small cost when it is desired to disassemble the chain for purposes for replacement of parts, lengthening or shortening the same, or effecting repairs.

Suitable embodiments of the invention are illustrated in the accompanying drawings wherein:

Fig. 1 is a longitudinal central sectional plan view of a sprocket chain constructed in accordance with the invention.

Fig. 2 is a fragmentary side elevation of one of the single piece links of the chain of Fig. 1.

Fig. 3 is a fragmentary detail vertical sectional view taken on the line 3—3 of Fig. 1.

Fig. 4 is an end elevation of a key member of the type shown in Fig. 3.

Fig. 5 is a side elevation of the same.

Fig. 6 is a fragmentary face view of the inner face of one of the outer links of the chain shown in Fig. 1.

Fig. 7 is a fragmentary vertical sectional view, similar to Fig. 3, illustrating a modified form of construction of the key member shown in Figs. 3, 4 and 5 and the shape of the pocket which receives the same.

Fig. 8 is similar to Fig. 1 of another conventional type of sprocket chain.

Fig. 9 is a vertical sectional view taken on the line 9—9 of Fig. 8.

The sprocket chain of Figs. 1 and 2 comprise

2 links 1 of the type illustrated in Fig. 2, the latter being of same shape at both ends and each of which include a bearing 2 and a longitudinal slot 3 of less width than the diameter of the bearing 2.

As shown in Fig. 1, the links 1 are alternated with pairs of links 4, each of which is equipped in its opposite ends with longitudinal slots 5 through which the flat sided end portions 6 and the flanges 7 of the pivot pins 8 are passed and then moved toward the ends of the links 4 to cause the said flanges 7 to engage in the recesses 9 bordering the outer ends of the slots 5 thereby to hold said pivot pins against longitudinal movement.

The pivot pins 8 are passed first through the bearings 2 of the links 1 with the flanges 7 of the pins 8 passing through the slots 3.

The cylindrical middle portions of the pins 8 are of length equal to the width of the links 1 which are rotatable about the pins and relative to the links 4 in the assembled chain.

The portion of each slot 5 which remains unoccupied by the end portion 6 of a pivot pin in the assembled chain provides a pocket 10 to receive a key member of any one of the types shown in Figs. 1 to 3, 7 and 9 respectively, the type of key members shown in Figs. 1 to 3 and 7 being preferred, and, if desired, are associated with key members 11b of solid metal which they hold against escape from the pockets 10.

The key members 11b, which may be omitted, are of length equal to that of the pockets 10 and are intended to bear compression stresses to which the key members are often subjected, in the event that such stresses may be greater than the member 11 would be able to bear, as in the event that the latter are made of thinner sheet metal than they should be.

The said key members 11b may be cylindrical, as shown in Fig. 3, or rectangular in cross-section, as shown in Fig. 7, but in all instances they must be of less width and height than the free space within the members 11.

The end portions or pockets 10 of the slots 5, which provide key receiving pockets for the key members 11, are provided with divergent side walls as shown in Fig. 3 and are of greatest width at their inner ends and thus the key members 11 are required to be flexed to force the arms thereof toward each other for insertion into the outer mouths of the slot portions 10 wherein they become self-retained with their side edges abutting flat opposed surfaces of the head portions 6 of the pins 8 and similar end surfaces of the pockets 10. The extremities of the arms of the members 11 then bear upon opposed surfaces of the links 1.

Each slot portion 10 is bordered at its outer end by and communicates with a recess 13 having an inclined bottom wall extending to greater depth than the arch of the key 11 and thus permits a key withdrawing member to be passed into the key 11 for manipulation to effect withdrawal thereof.

The width of the key members 11 may be substantially equal to the length of the pocket 10, it being obvious that pockets of the shape shown in Fig. 3 or that which is shaped to receive a key 11b of the type shown in Fig. 7 may be formed in casting or forging the links 4 and will require no other operation to shape the same.

In Fig. 7, the link 4a which corresponds with the links 4 is equipped with pockets 10a differing slightly in cross-sectional shape from the pockets 10 of Fig. 3, the side walls of same being parallel and beveled only at their inner ends to receive the terminal flanges 17 of the key members 11a.

The solid key members 11c of Fig. 7 are rectangular instead of cylindrical as in Fig. 3.

Obviously the members 11, 11a, 11b and 11c may be all of equal length corresponding substantially to the length of the pockets 10 and 10a to provide composite key elements, all of which bear the compression stresses above mentioned. The key members 11b may be of any desired shape in cross-section but must be of smaller area than the open spaces of the key members 11 and 11a respectively, and dropped into the pockets 10 before the latter are inserted.

In the structure of Figs. 8 and 9, the links 4b correspond with the links 4 except that in place of the recesses 9 the links 4b are equipped with parallel side flanges 15 bordering the longitudinal slots 5b which receive the flat sided ends of the pivot pins 8. The inner faces of said flanges 15 are, preferably, flush with the side walls of said slots 5b.

The portions of said flanges 15, which border the key 12 receiving end portions of the slots 5b, are equipped with openings 16 to receive the flanges 14 of the arms of the keys 12, the latter being flexed to effect contraction thereof during insertion of same.

In this structure, the recesses 13a are of depth sufficient to permit a key ejecting tool to project below the bottoms of the keys 12 to effect removal of the latter while another tool, such as a pair of pliers, is operated to eject the said flanges 14 from the openings in the flanges 15.

The last-named openings 16 are merely exemplary of suitable keys 12 retaining formations cooperative with the outer normally divergent extremities of the arms of keys 12 to cause the latter to be self-retained in proper position.

Sprocket chains of practically all conventional types are used, in many instances, to carry products through heat treating equipment wherein the same become very hot. In response to such heat, the key members 11, 11a and 12, or equivalents thereof, expand, but upon cooling they do not contract to a degree to render them capable of escape from the pockets in which they are engaged.

I claim:

1. A sprocket chain including links equipped with longitudinal slots in end portions thereof, pivot elements each equipped at its ends with projecting flanges connecting said links with companion links with said flanged ends projecting through said slots and the flanges of same overlapping outer face portions of the slotted links bordering the ends of said slots nearest adjacent the ends of said links, the latter equipped with formations co-operating with said flanges to hold the said pivot elements against rotation relative to said slotted links, there being free spaces in said slots between the end portions of said pivot elements and the opposed end walls of said slots constituting pockets, and U-shaped sheet metal key members having parallel side edges disposed within and substantially filling the remainder of said slots with said side edges opposed to said pivot elements and the last-named end walls of said slots, said key members and links equipped with interengaging formations operating to maintain said key members detachably engaged with said links.

2. A structure, as defined in claim 1, wherein said key members are composed of resilient sheet metal and are equipped at their ends with flared formations spaced apart a distance greater than the width of said slots and said links are equipped with formations to receive said flared formations for cooperation therewith to retain said key members detachably engaged within said slots.

3. A sprocket chain comprising alternate links, link connecting pivot pins equipped at their ends with flat sided formations and flanges, longitudinal slots in the end portions of alternate links through which said end portions of said pivot pins pass with their flanges overlapped upon outer face portions bordering one end of each slot, the remaining unoccupied portions of said slots being of greater width at their inner ends than at their mouths, and constituting pockets to receive key members, and resilient bowed key members equipped with divergent arms having their ends spaced apart a distance greater than the width of the mouths of said pocket arms substantially filling said pockets and engaging the side walls of the same at the points of greatest width of the latter.

4. A sprocket chain including links equipped with longitudinal slots in end portions thereof, pivot elements each equipped at its ends with projecting flanges connecting said links with companion links with said flanged ends projecting through said slots and the flanges of same overlapping outer face portions of the slotted links bordering the ends of said slots nearest adjacent the ends of said links, there being normally unoccupied portions of said slots constituting pockets to receive key members, wherein the said pockets are of greater width at their inner than their outer mouths and substantially U-shaped resilient key members having arms of normally greater width than the outer mouths of said pockets projecting into the latter and substantially filling the latter, and wherein said links and key members are equipped with formations permitting engagement of said key members by a tool for extracting them from said pockets.

5. A structure, as defined in claim 3, wherein said resilient key members are of length substantially equal to the length of said pockets and of height substantially equal to the depth of the same.

6. A sprocket chain comprising alternate links, link connecting pivot pins equipped at their ends with flat sided formations and flanges, longitudinal slots in the end portions of alternate links through which said end portions of said pivot pins pass with their flanges overlapped upon outer face portions bordering one end of each slot, the remaining unoccupied portions of said slots being of greater width at their inner ends than at their mouths and constituting pockets to receive key members, and resilient bowed key members equipped with divergent arms spaced apart a distance greater than the width of the mouths of said pockets substantially filling said pockets and engaging the side walls of the same at the points of greatest width of the latter, and solid, non-resilient key members of a length substantially equal to the length of said slots and of less width and height than said resilient key members disposed in the bottoms of said pockets and between divergent arms of said resilient key members, the latter and said solid key members being opposed at one end each to the inner end wall of the pocket containing the same and opposed at their other ends to an end portion of a pivot pin.

7. A sprocket chain including links equipped with longitudinal slots in end portions thereof, pivot elements, each equipped at its ends with projecting flanges, connecting said links with companion links with said flanged ends projecting through said slots and the flanges of same overlapping outer face portions of the slotted links bordering the ends of said slots nearest adjacent the ends of said links, the other end portions of said slots constituting pockets being of greatest width at the inner mouths of said pockets, resilient substantially U-shaped key members, having arms spaced apart at their ends a distance greater than the outer mouths of said pockets, disposed within the latter and constituting stops preventing movement of the pivot pins toward the inner ends of said slots, the said arms of said key member cooperating with the widest portions of said pockets to retain said key members within the latter.

8. A structure, according to claim 7, wherein the middle portions of the slotted links are provided with longitudinal recesses in their outer faces communicating with the said pockets at levels below the middle portions of said resilient key members, and wherein said pockets contain solid non-resilient key members of length substantially equal to that of said pockets disposed within the resilient key members and which are of less height and width than the latter.

ERNEST E. CRANE.

REFERENCES CITED

The following references are of record in the file of this patent:

UNITED STATES PATENTS

| Number | Name | Date |
| --- | --- | --- |
| 1,808,236 | Lerner | June 2, 1931 |